(12) United States Patent
Dreyer et al.

(10) Patent No.: US 8,544,271 B2
(45) Date of Patent: Oct. 1, 2013

(54) PYROTECHNIC ACTUATOR WITH FILTER

(75) Inventors: Bernd Dreyer, Taunusstein (DE); Joachim Schäfer, Darmstadt (DE); Erik Wiesinger, Heidesheim (DE); Rolf Wich, Hainburg (DE); Axel Thielert, Krombach (DE)

(73) Assignee: GM Global Technology Operations LLC, Detroit, MI (US)

( * ) Notice: Subject to any disclaimer, the term of this patent is extended or adjusted under 35 U.S.C. 154(b) by 917 days.

(21) Appl. No.: 12/427,491

(22) Filed: Apr. 21, 2009

(65) Prior Publication Data

US 2010/0024420 A1 Feb. 4, 2010

(30) Foreign Application Priority Data

Apr. 22, 2008 (DE) .......................... 10 2008 020 087

(51) Int. Cl.
*F01B 29/08* (2006.01)
(52) U.S. Cl.
USPC .............................................. 60/634; 60/632
(58) Field of Classification Search
USPC .................................... 60/632–638
See application file for complete search history.

(56) References Cited

U.S. PATENT DOCUMENTS

| | | | | |
|---|---|---|---|---|
| 3,142,958 A | * | 8/1964 | Roberts et al. ................. | 60/636 |
| 4,074,527 A | * | 2/1978 | Sadler ............................ | 60/325 |
| 4,658,588 A | * | 4/1987 | Pinson ........................... | 60/637 |
| 5,753,852 A | * | 5/1998 | Bernau et al. .................. | 102/530 |
| 6,106,008 A | * | 8/2000 | Blackshire et al. ........... | 280/737 |

FOREIGN PATENT DOCUMENTS

| | | |
|---|---|---|
| AT | 7000 U1 | 7/2004 |
| DE | 102006008900 A1 | 8/2007 |
| GB | 2347539 A | 9/2000 |
| GB | 2457800 A | 9/2009 |
| WO | 0216178 A1 | 2/2002 |
| WO | 2006014974 A2 | 2/2006 |
| WO | 2007113299 A1 | 10/2007 |

OTHER PUBLICATIONS

German Patent Office, German Search Report for German Application No. 102008020087.5, Nov. 26, 2009.
British Patent Office, British Search Report for Application No. GB0906018.7, dated Aug. 30, 2011.
British Patent Office, British Search Report for Application No. GB0906018.7 dated Jul. 15, 2009.

* cited by examiner

*Primary Examiner* — Hoang Nguyen
(74) *Attorney, Agent, or Firm* — Ingrassia Fisher & Lorenz, P.C.

(57) ABSTRACT

A pyrotechnic actuator is provided for an active hood that encompasses an installation site for a gas generator, a cylinder incorporating a moving piston and a compressed gas line that joins the installation site with the cylinder. A filter body for trapping particles from the gas stream of the gas generator is arranged on the compressed gas line.

16 Claims, 5 Drawing Sheets

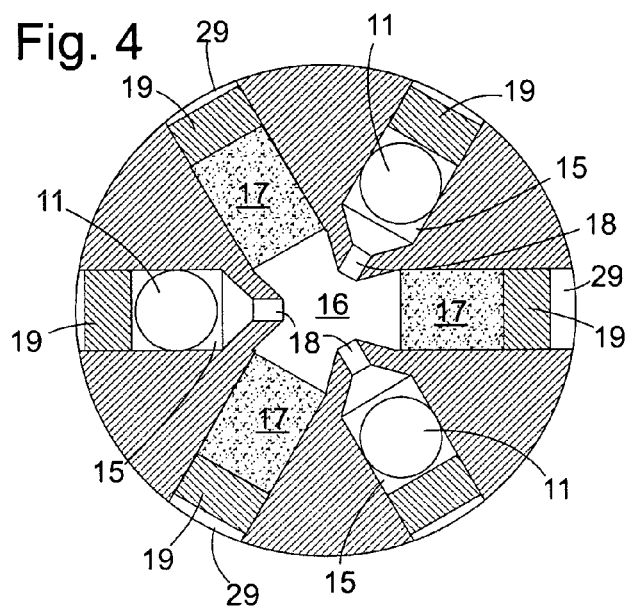
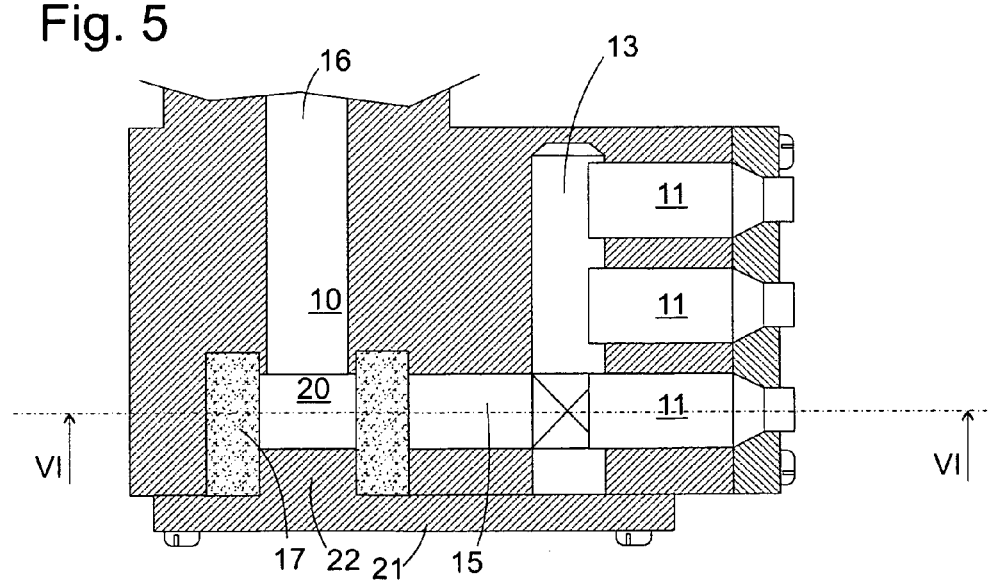

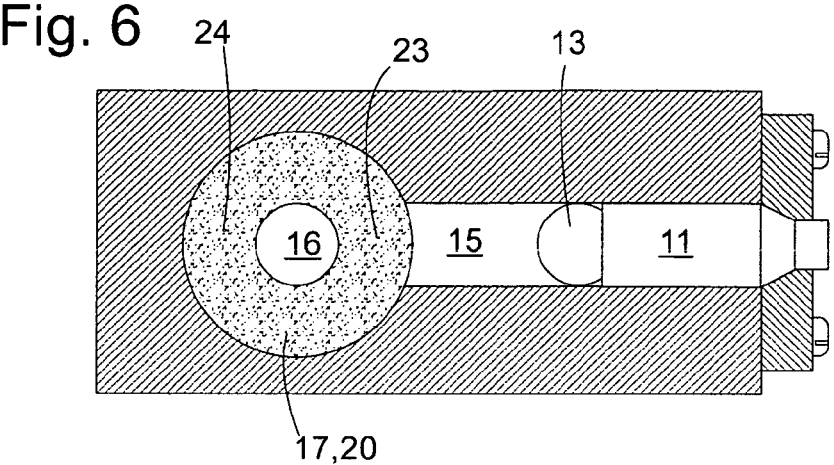
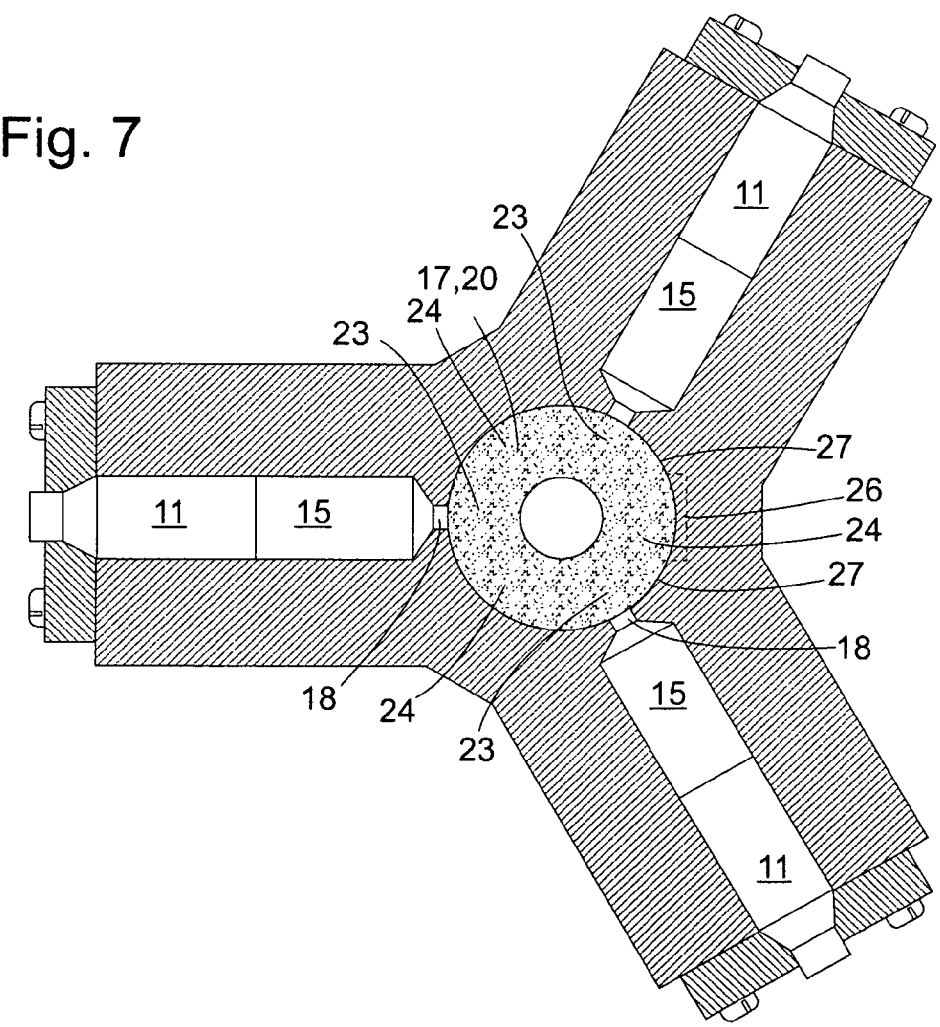

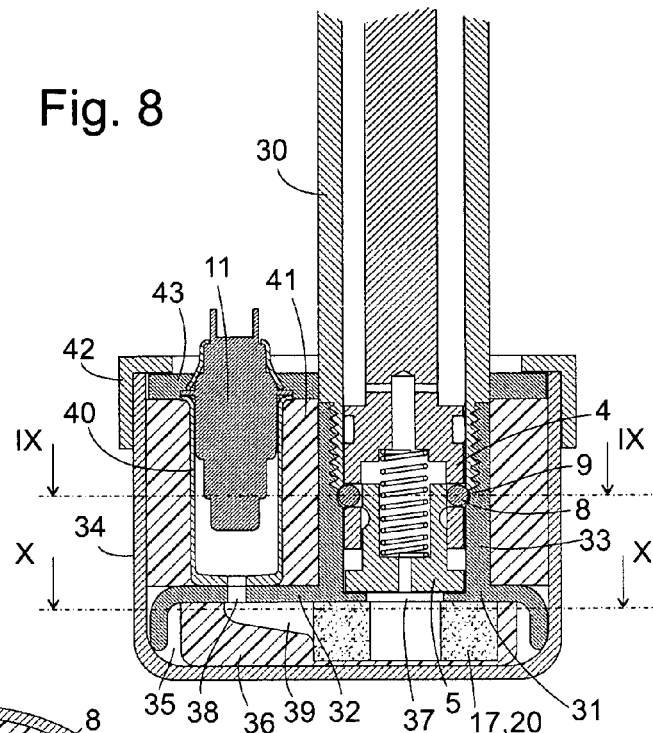
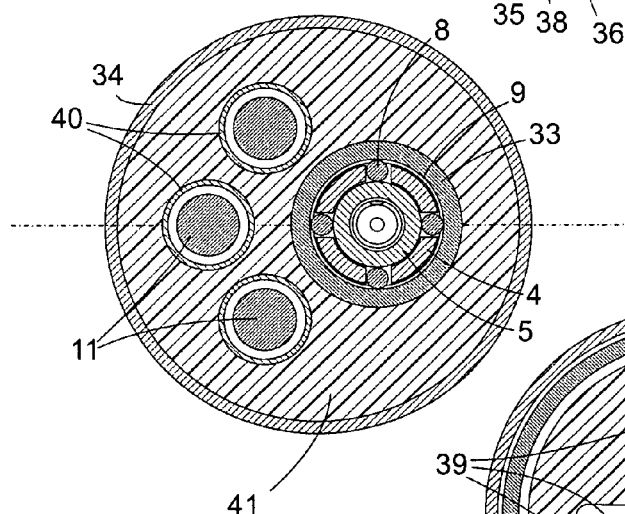
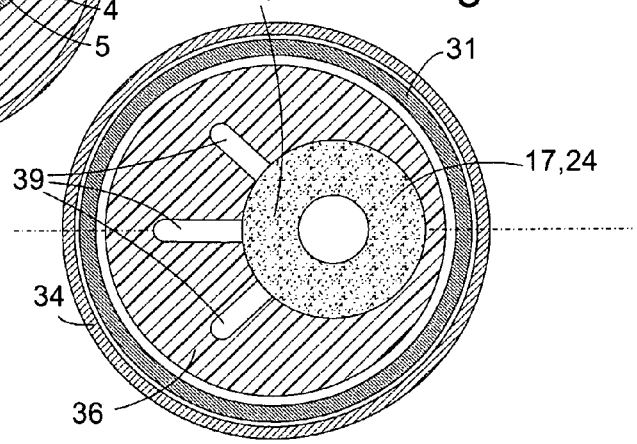

PYROTECHNIC ACTUATOR WITH FILTER

CROSS-REFERENCE TO RELATED APPLICATION

This application claims priority to German Patent Application No. 102008020087.5, filed Apr. 22, 2008, which is incorporated herein by reference in its entirety.

TECHNICAL FIELD

The present invention relates to a pyrotechnic actuator for an active hood of a motor vehicle.

BACKGROUND

A pyrotechnic actuator is known from DE 10 2006 008 900 A1, for example. The object of such an actuator is to lift the front hood of a motor vehicle involved in an accident in the shortest time possible by igniting a propellant charge to increase the distance between the hood and underlying parts of the engine block or other non-deformable components of the vehicle, thereby creating as expansive a delay zone as possible for any impacted pedestrian to lower the danger of serious injury.

In practice, it turns out that the compressed gas supplied by the propellant charge is significantly encumbered with solid particles that get into the cylinder of the actuator upon its activation. As a result, the actuator can only be used a second time, if at all, if the particles are removed from the cylinder. This requires that the actuator go through a costly stay at the workshop each time it is triggered.

In view of the foregoing, at least one object of the present invention is to provide a pyrotechnic actuator that can be reused with the lowest outlay. In addition, other objects, desirable features, and characteristics will become apparent from the subsequent summary and detailed description, and the appended claims, taken in conjunction with the accompanying drawings and this background.

SUMMARY

The at least one object, and other objects, desirable features, and characteristics, is achieved in a pyrotechnic actuator for an active hood with a gas generator, a cylinder incorporating a moving piston and a compressed gas line, which links the gas generator with the cylinder, and a filter body is arranged on the compressed gas line to trap particles contained in the compressed gas of the gas generator.

Surprisingly, it was shown that a good filtering effect can be achieved with a filter body that covers a wall of the compressed gas line.

It makes sense in particular to align an upstream section of the compressed gas line in such a way as to form a gas jet aimed against the covered wall. Because of their mass inertia, the particles contained in the gas jet penetrate more deeply into the material of the filter body than the gas, so that the gas can no longer entrain them once they come to rest in the filter body.

In order to achieve this effect, it is not necessary for the gas stream to traverse the filter body; rather a downstream section of the compressed gas line preferably proceeds from a surface of the filter body receiving the stream.

To efficiently separate out the particles, it is advantageous if the upstream and downstream section of the compressed gas line be aligned at a right angle to each other.

A filter body that crosses the compressed gas line can also be provided. The design of the actuator is simplified by having the filter body covering the wall and the filter body crossing the compressed gas line in sections of one and the same filter body.

Such an arrangement can be easily realized by designing the filter body as a hollow item, and having an inner cavity of the filter belong to the downstream section of the compressed gas line.

In particular, the filter body can be tubular, and a first peripheral section of the tubular filter body covers the wall, and a peripheral section lying opposite the first peripheral section is adapted to cross the upstream line section.

This filter body can be enveloped by an annular or sectoral cavity, which belongs to the upstream section of the compressed gas line.

Several upstream line sections each originating with various gas generators advantageously hit various sections of the filter body. Since the cylinder is protected against particles by the preceding filter body, and can hence be used multiple times, the several gas generators for repeated use of the cylinder can already be integrated into the actuator from the start. This minimizes the repair outlay after an accident, since parts of the pyrotechnic actuator need only be replaced or enhanced once all gas generators have been expended. Because the line sections are aligned toward respectively different sections of the filter body, a different section of the filter body is used to filter out the particles each time the actuator is activated, so that the efficiency and permeability of the filter remains essentially unchanged over several activations.

The actuator can be given an especially compact design by arranging the sections of the filter body crossing the compressed gas lines on a first half of the circumference of the filter body, and the sections covering the wall on a second half.

Another configuration makes it possible to accommodate the filter body in a blind cavity that faces the upstream section.

The piston can preferably be locked in the cylinder, and unlocked by the supply of compressed gas.

BRIEF DESCRIPTION OF THE DRAWINGS

The present invention will hereinafter be described in conjunction with the following drawing figures, wherein like numerals denote like elements, and:

FIG. 4 is a section analogous to FIG. 3 according to a third embodiment of the invention;

FIG. 5 is an axial section according to a fourth embodiment of the invention;

FIG. 6 is a section along the VI-VI plane from FIG. 5;

FIG. 7 is a radial section analogous to FIG. 6 according to a fifth embodiment of the invention;

FIG. 8 is a partial longitudinal section through the socket area of a pyrotechnic actuator according to a sixth embodiment of the invention;

FIG. 9 is a section along the IX-IX plane from FIG. 8; and

FIG. 10 is a section along the X-X-plane from FIG. 8.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
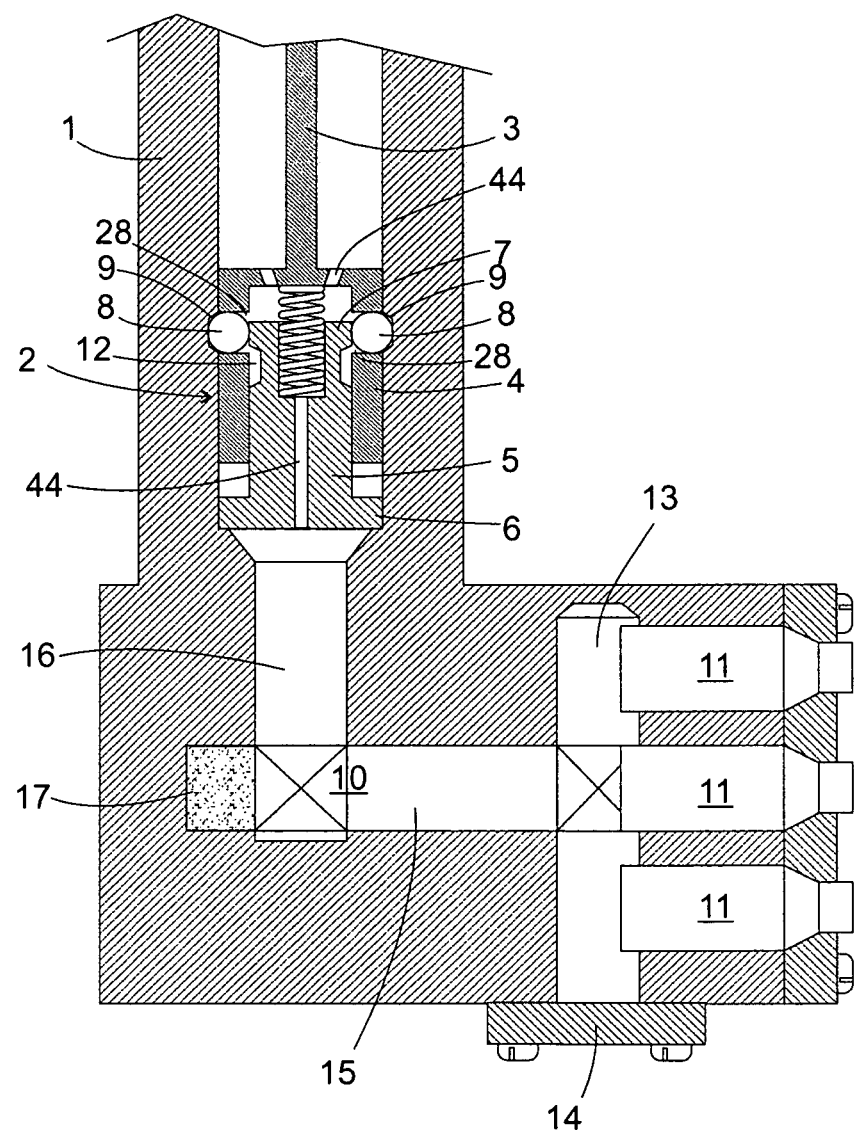
FIG. 1 is a partial longitudinal view through the socket area of a pyrotechnic actuator according to a first embodiment of the invention.

FIG. 1 shows a section through an actuator according to an embodiment of the invention along the longitudinal axis of its cylinder 1 only partially depicted on the figure. A sliding piston 2 inside the cylinder 1 is secured to an engine hood of a motor vehicle to be lifted by the actuator (not shown on the figure) by a piston rod 3 exiting at the upper end of the cylinder 1. The entire actuator is mounted under the engine hood in the body structure of a motor vehicle.

The piston 2 encompasses a hollow cylindrical piston sheath 4 rigidly connected with the piston rod 3 and open toward the bottom, and a slider 5 with an essentially cylindrical shape, the bottom side of which is enlarged by a continuous collar 6, so that it fills out the free cross section of the cylinder 1 to the exclusion of a slight clearance. In the configuration shown, a top section 7 of the slider 5 holds a plurality of latching balls 8 securely in a position where some are accommodated in boreholes 28 in the jacket sheath 4, and others engage a groove 9 on the inside of the cylinder 1. The latching balls 8 keep the piston 2 locked firmly in place, so that the engine hood on the motor vehicle body remains securely anchored by the actuator.

A compressed gas line 10 links the bottom side of the slider 5 with a plurality of gas generators 11. When one of these gas generators 11 is fired, the compressed gas it supplies first streams against the bottom side of the slider 5, forcing it upwards. As a result, a continuous groove 12 of the slider 5 moves to the level of the latching balls 8, while the slider 5 simultaneously hits the jacket sheath 4, and conveys the pressure of the gas to it. This causes the latching balls 8 to slip out of the groove 9 of the cylinder 1 and into the groove 12 of the slider 5, releasing the lock of the piston 2. The piston can now yield to the pressure of the gas and lift the hood.

The compressed gas line 10 encompasses a plurality of boreholes incorporated into the massive metal socket of the cylinder 1. Three parallel boreholes each form chambers, which incorporate gas generators 11. They are interconnected by a collective borehole 13, which is introduced from the bottom side of the socket and tightly sealed by a cover 14. One of the three boreholes marked 15 that accommodates the gas generators 11 is lengthened up to the longitudinal axis of the cylinder 1 and a bit further beyond that. It crosses a borehole 16 that axially lengthens the chamber of the cylinder 1. A filter body 17 comprised of a porous material is housed in a sack-like end section of the borehole 15 lying opposite the gas generator 11 on the other side of the borehole 16.

When one of the gas generators 11 is fired, the compressed gas ejected by it first shoots along the borehole 15 until deflected in the crossing zone of the boreholes 15, 16. Particles entrained by the compressed gas cannot catch up with the directional change of the gas fast enough, are carried through the crossing area, and hit the opposing filter body 17, where they remain stuck. The compressed gas that finally reaches the chamber of cylinder 1 is essentially free of particles. As a result, the actuator can be activated several times without having to be taken apart and cleaned after each time activated.

A borehole 44 running through the piston 2 allows the compressed gas to seep out after the piston 2 has been released and lifted. As a result, after keeping the hood lifted for the time necessary for cushioning the pedestrian, the piston 2 can be pressed backs into the position shown on FIG. 1 without exerting a lot of force, and be locked into that position once again.

Figure 2:
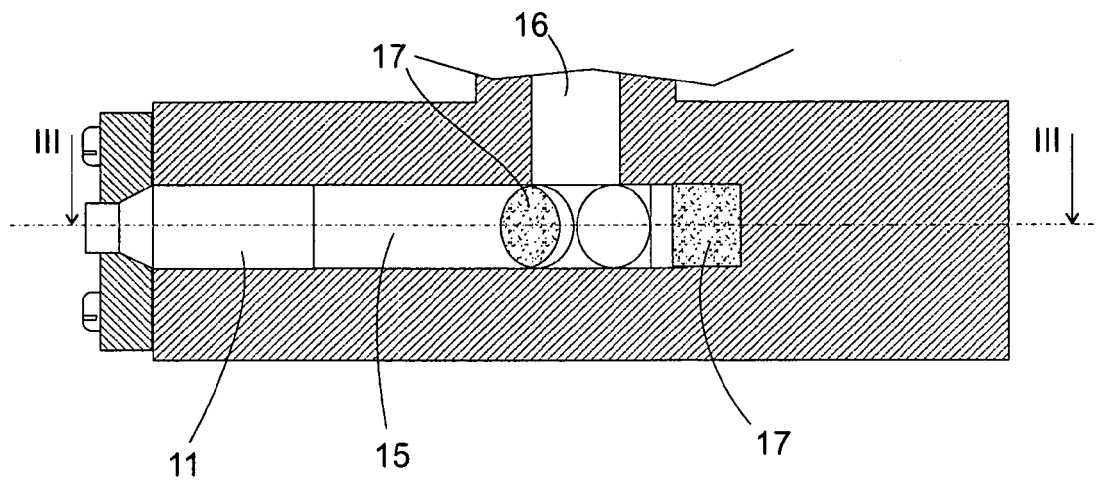
FIG. 2 is an axial view through the socket area of an actuator according to a second embodiment of the invention.

FIG. 2 shows an axial section through the socket area of a pyrotechnic actuator according to a second embodiment of the invention. The cylinder of the actuator itself and the piston accommodated therein are not shown; their structural design can be the same as described above with reference to FIG. 1. The collective borehole 13 is omitted in this embodiment; in its place, each of a total of three gas generators 11 is incorporated in a separate upstream borehole 15, which runs in a radial direction toward the downstream axial borehole 16 and is lengthened a bit beyond the latter to form a receiving pocket for a filter body 17. As readily evident in the radial section on FIG. 3, each gas generator 11 lies opposite a filter body 17, which is flanked on both sides by the boreholes 15 of other gas generators 11, and traps particles of the gas generator 11 opposite it.

Figure 3:
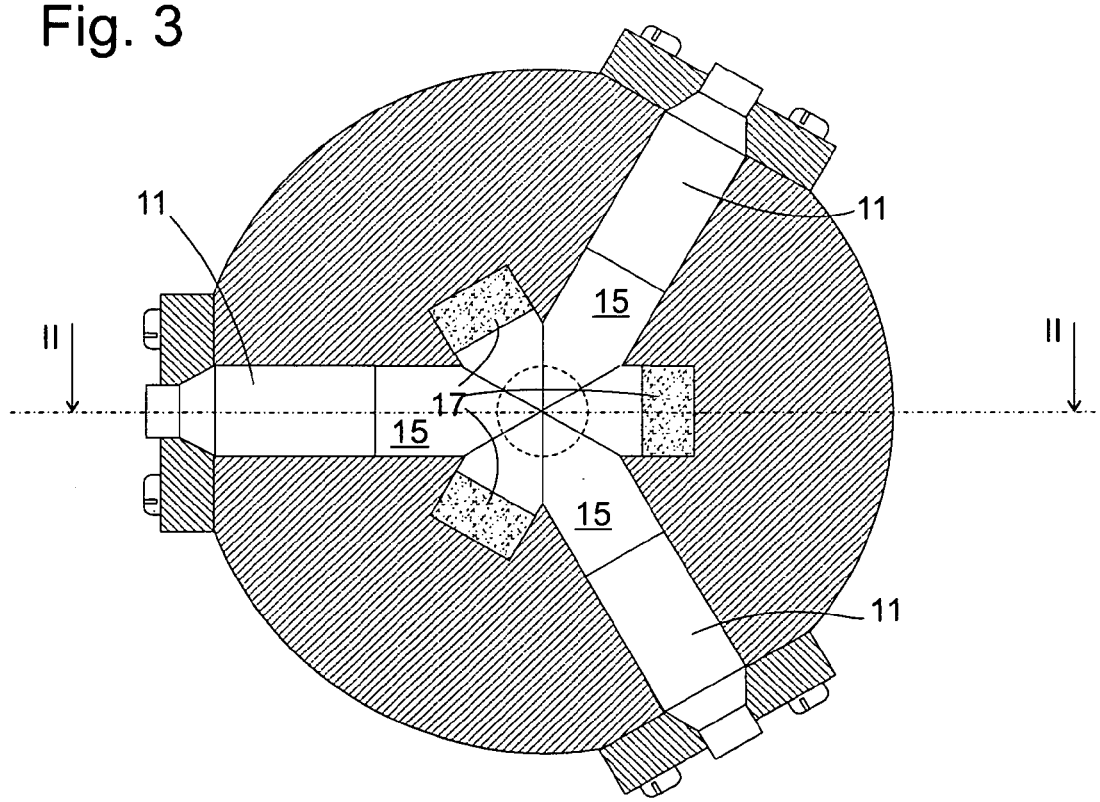
FIG. 3 is a radial section along the III-III plane from FIG. 2.

In a radial section along the same plane on FIG. 3, FIG. 4 shows a third embodiment of the actuator. In order to reduce the diameter of the actuator socket, the gas generators 11 are here accommodated in boreholes parallel to the piston axis, and hence visible in a top view on the figure. Upstream boreholes 15 into which the gas generators 11 release their respective compressed gas are oriented radially, perpendicular to the longitudinal axis of the cylinder 1, and end in a shared axial parallel, downstream borehole 16 via nozzles 18. The nozzles 18 bundle the ejected compressed gas on the filter body 17 lying respectively diametrically opposite the nozzle 18. The respective filter body 17 is accommodated in a borehole 29 diametrically opposite the upstream borehole 15 of the allocated gas generator 11, and both boreholes 15, 29 are each sealed to the outside by screwed-in stoppers 19.

FIG. 5 in turn shows an axial section through the socket area of an actuator according to a fourth embodiment of the invention. The arrangement of gas generators 11 is the same as described in reference to FIG. 1. The structural design of the cylinder 1 and the piston 2 is also identical to the one shown on FIG. 1, and hence not shown separately on FIG. 5.

A hollow cylindrical or tubular filter body 17 is incorporated in a chamber in the crossing area of a radially oriented upstream borehole 15 and a downstream borehole 16 running on the cylindrical axis. In the present case, the chamber 20 is formed by a borehole with a large diameter, which is advanced from the bottom side of the socket and oriented coaxially to the borehole 16, just as a collective borehole 13 that joins the gas generators 11 with the borehole 15. The collective borehole 13 and chamber 20 are here sealed by a shared cover 21.

If required by the structure of the material comprising the filter body 17, the filter body 17 can be stabilized against the pressure of the gas released by one of the gas generators 11 by having the journal 22 of the cover 21 extend a bit inside the cavity of the filter body 17 and/or an upper edge of the filter body 17 extend into a groove on the cover of the chamber 20.

As evident from the section on FIG. 6, the filter body 17 has two areas 23, 24 that act in respectively different ways on the gas stream of the gas generator 11. The gas stream passes by the area 23 facing the gas generator 11, catching a portion of the particles contained therein. Since the area 23 does not have to catch all particles, it can be highly porous, so that the pressure drop at area 23 can be kept low enough not to notably delay the raising motion of the hood, and not to load the filter material beyond its load-bearing limit. The convex bulging of the surface of the filter body 17 facing the gas generator 11 increases its load-bearing capacity further.

Particles that were not trapped in the traversed area 23 of the filter body 17 pass through the inner cavity of the filter body 17, and head to the area 24 on the opposite side, where they remain stuck.

FIG. 7 shows an axial section through a fifth embodiment of the actuator, which combines the features of the second and fourth embodiment. Three radial boreholes 15 respectively fitted with a gas generator 11 empty via nozzles 18 into a cylindrical chamber 20, which is equipped with a tubular filter body 17. The filter body 17 has three sections 23, 24 that alternate in the peripheral direction. The sections 23 lying in front of a respective nozzle 25 carry the compressed gas from one of the gas generators 11 when fired; adjacent sections 24 trap the respective particles of another of the gas generators 11 that have passed the respectively diametrically opposing area 23 without being caught. Since separate areas 23 or 24 are allocated to each gas generator 11 in this embodiment, the gas from each gas generator 11 that is fired hits fresh sections of the filter body 17 not yet encumbered with the particles of other gas generators. For this reason, the efficiency of the filter body 17 remains essentially just as good when activating the third gas generator 11 as it was when generating the first.

The sections 24 of the filter body do not have to completely abut a wall area of the chamber 20 that they cover. As denoted by a dashed line on FIG. 7, a well chamber 26 for particles can be recessed diametrically opposite to a respective borehole 15. However, areas 27 of the wall should contact the filter body 17 between such a well chamber 26 and adjacent nozzles 24 to prevent an area 24 already loaded with particles from being flushed in the opposite direction when another gas generator 11 is activated, entraining particles trapped therein.

A preferred embodiment of the pyrotechnic actuator according to an embodiment of the invention is described based on the axial section on FIG. 8 and the two cross sections on FIG. 9 and FIG. 10, which each show sections along the IX-IX or X-X planes on FIG. 8. Elements of this actuator that were already described with respect to the preceding embodiments are marked with the same reference numbers, and will only be elucidated below to the extent that there are differences relative to the other embodiments.

The cylinder 1 of this actuator consists of at least two elements joined together, a long stretched-out pipe section 30 and a footing 31. The footing 31 has a base plate 32 and a pipe fitting 33 projecting from the base plate 32, into which the pipe section 30 is screwed. The groove 9 forms a border between the pipe section 30 and the footing 31, so that both parts 30, 31 can be easily fabricated without back cuts.

The footing 31 is housed in a pot-shaped casing 34. The base plate 32 and a floor area of the casing 34 border a cavity 35, which incorporates a molding 36 and, in a flat chamber 20 of the latter, an annular or tubular filter body 17. A large opening 37 in the floor plate 33 joins the chamber of the cylinder 1 with the interior cavity of the filter body 17. Three smaller openings 38 of the base plate 32 are joined with the outside of the filter body 17 by ditches 39 which are recessed in the molding 36.

Three sleeves 40 parallel to the axis of the cylinder 1 are embedded in a second molding 41 above the base plate 32. A ring 42 screwed onto the upper edge of the casing 34 keeps a cover plate 43 pressed against the molding 41. The respective gas generators 11 are positively secured to openings of the cover plate and in the sleeves 40.

The compressed gas ejected by one of the gas generators 11 passes through an opening in the floor of the sleeve 40 accommodating the generator, one of the openings 38 in the floor plate 33 and one of the ditches 39 and on to the filter body 17. The sections 23 of the filter body 17 carrying gas from the three gas generators 11 extend roughly over half its periphery; the sections 24 where the compressed gas passing through the sections 23 is diverted and the residual particles of the compressed gas are trapped in the process form another half of the periphery of the filter body 17. As evident, the fact that the gas generators 11 are oriented parallel to the cylindrical axis 1 and placed on the same half of the periphery of the filter 17 enables an especially compact design of the actuator.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A pyrotechnic actuator for an active hood with an installation site for a gas generator, comprising:
   a moving piston;
   a cylinder incorporating the moving piston;
   a compressed gas line that joins the installation site with the cylinder; and
   a filter body arranged on the compressed gas line
   wherein the filter body is adapted to cover a wall of the compressed gas line and wherein an upstream section of the compressed gas line is aligned to form a gas jet aimed against the wall covered by the filter body.

2. The pyrotechnic actuator according to claim 1, wherein a downstream section of the compressed gas line proceeds from a surface of the filter body receiving a stream.

3. The pyrotechnic actuator according to claims 2, wherein a upstream line section and the downstream section of the compressed gas line are aligned at a substantially right angle to each other.

4. The pyrotechnic actuator according to claim 1, wherein the filter body is adapted to cross the compressed gas line.

5. The pyrotechnic actuator according to claim 1, wherein the filter body is adapted to cover the wall and the filter body crossing the compressed gas line are sections of an identical filter body.

6. The pyrotechnic actuator according to claim 5, wherein the filter body is a hollow item, and an inner cavity of a filter belongs to a downstream section of the compressed gas line.

7. The pyrotechnic actuator according to claim 5, wherein the filter body is tubular, wherein a first peripheral section of the filter body is adapted to cover the wall, and a second peripheral section lying opposite the first peripheral section is adapted to cross an upstream line section.

8. The pyrotechnic actuator according to claim 7, wherein the filter body is enveloped by a cavity, which belongs to the upstream line section of the compressed gas line.

9. The pyrotechnic actuator according to claim 1, wherein a plurality of upstream line sections are aligned toward various sections of the filter body.

10. The pyrotechnic actuator according to claim 9, wherein the sections of the filter body crossing the plurality of upstream line sections are adapted to lie on one half of a periphery, and the sections adapted to cover a wall are adapted to lie on a second half of the periphery.

11. The pyrotechnic actuator according to claim 1, wherein the filter body is accommodated in a blind cavity that faces the upstream section.

12. The pyrotechnic actuator according to claim 1, wherein the pyrotechnic actuator is reversible.

13. The pyrotechnic actuator according claim 1, wherein the moving piston can be locked in the cylinder and unlocked by a supply of compressed gas.

14. The pyrotechnic actuator of claim 1, further comprising a second filter body having substantially greater porosity than the filter body, the second filter body disposed to obstruct the fluid path.

15. The pyrotechnic actuator of claim 14, wherein the filter body and the second filter body are contiguous with one another.

16. The pyrotechnic actuator of claim 15, wherein the filter body and the second filter body comprise different portions of a cylindrical filter.

\* \* \* \* \*